United States Patent [19]

Frantom et al.

[11] Patent Number: 5,022,674
[45] Date of Patent: Jun. 11, 1991

[54] DUAL PYROTECHNIC HYBRID INFLATOR

[75] Inventors: Richard L. Frantom, Richmond; Robert J. Bishop, Washington; Robert Kremer; Klaus Ocker, both of Fraser, all of Mich.; Roy Brown, Hot Springs, Ark.; James Rose, Fairfax, Va.; Donald Renfroe, Haymarket, Va.; Teresa Bazel, Annandale, Va.

[73] Assignee: Bendix Atlantic Inflator Company, Troy, Mich.

[21] Appl. No.: 505,289

[22] Filed: Apr. 5, 1990

[51] Int. Cl.[5] .............................................. B60R 21/26
[52] U.S. Cl. ..................................... 280/741; 280/737; 280/107
[58] Field of Search .................. 280/737, 741; 222/5; 423/262; 102/202, 202.5, 202.12

[56] References Cited

U.S. PATENT DOCUMENTS

| Re. 28,624 | 11/1975 | Lewis et al. | 280/150 AB |
|---|---|---|---|
| 3,723,205 | 3/1973 | Scheffee | 149/19 |
| 3,731,843 | 5/1973 | Anderson, Jr. | 280/741 |
| 3,756,621 | 9/1973 | Lewis | 280/741 |
| 3,786,843 | 1/1974 | Stephenson et al. | 280/737 |
| 3,883,156 | 5/1975 | Frazier | 280/737 |
| 3,895,821 | 7/1975 | Schotthoefer et al. | 280/741 |
| 3,910,596 | 10/1975 | Wulbrecht et al. | 280/737 |
| 3,966,226 | 6/1976 | Roth | 280/737 |

FOREIGN PATENT DOCUMENTS 966529  4/1975  Canada .............................. 280/737

Primary Examiner—Richard A. Bertsch

[57] ABSTRACT

An inflator for an air cushion including a pressure vessel comprising a hollow sleeve for storing a quantity of inert gas such as Argon. One end of the sleeve is closed by a first pyrotechnic actuator assembly while the other end of the sleeve may include a closed end or another pyrotechnic actuator assembly. The pressure vessel is secured within a diffuser which directs inflation gases into the air cushion. The pressure vessel in cooperation with the diffuser defines various regions which assist in reducing the gas turbulence and heat transfer between the gas and the diffuser.

17 Claims, 4 Drawing Sheets

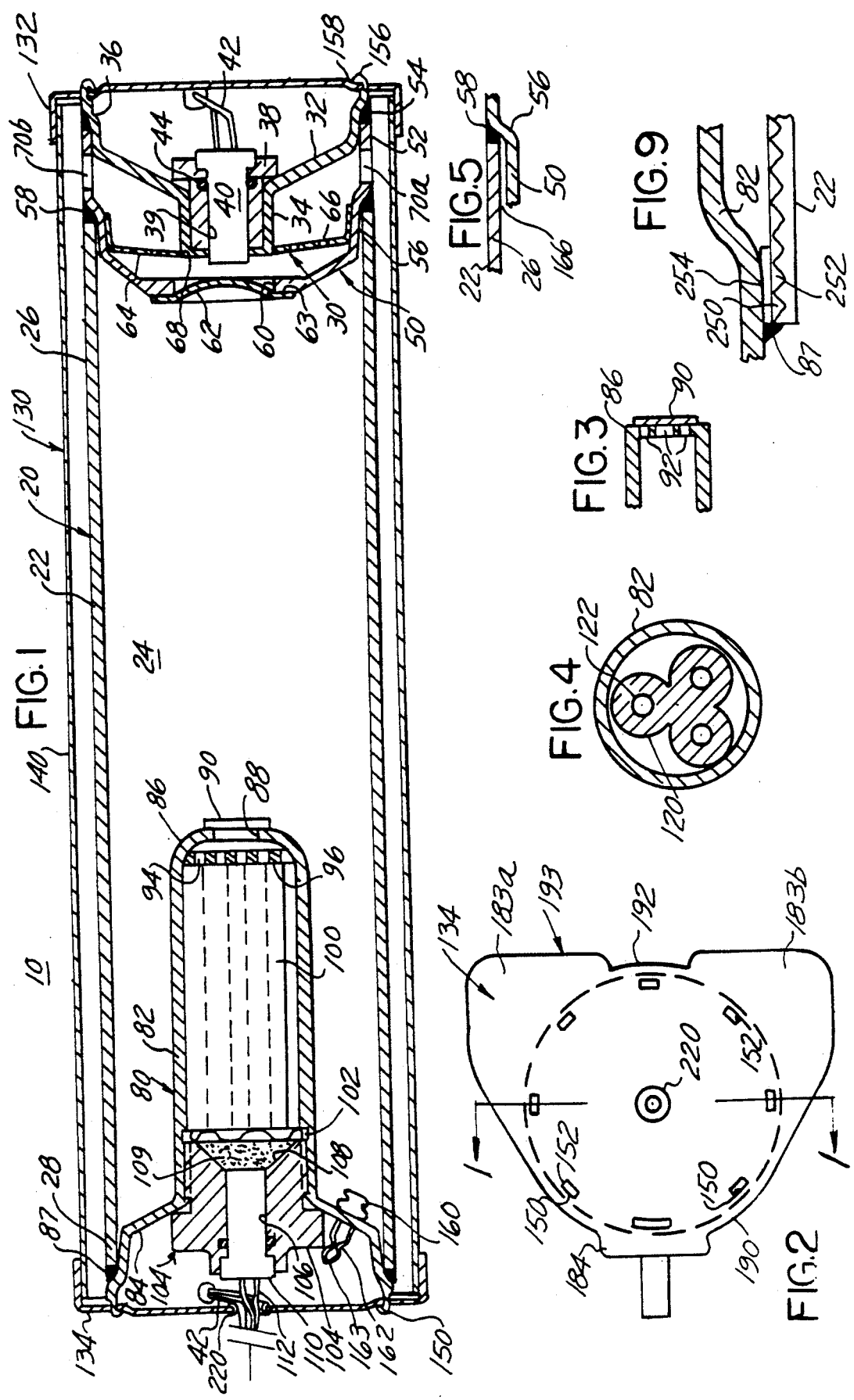

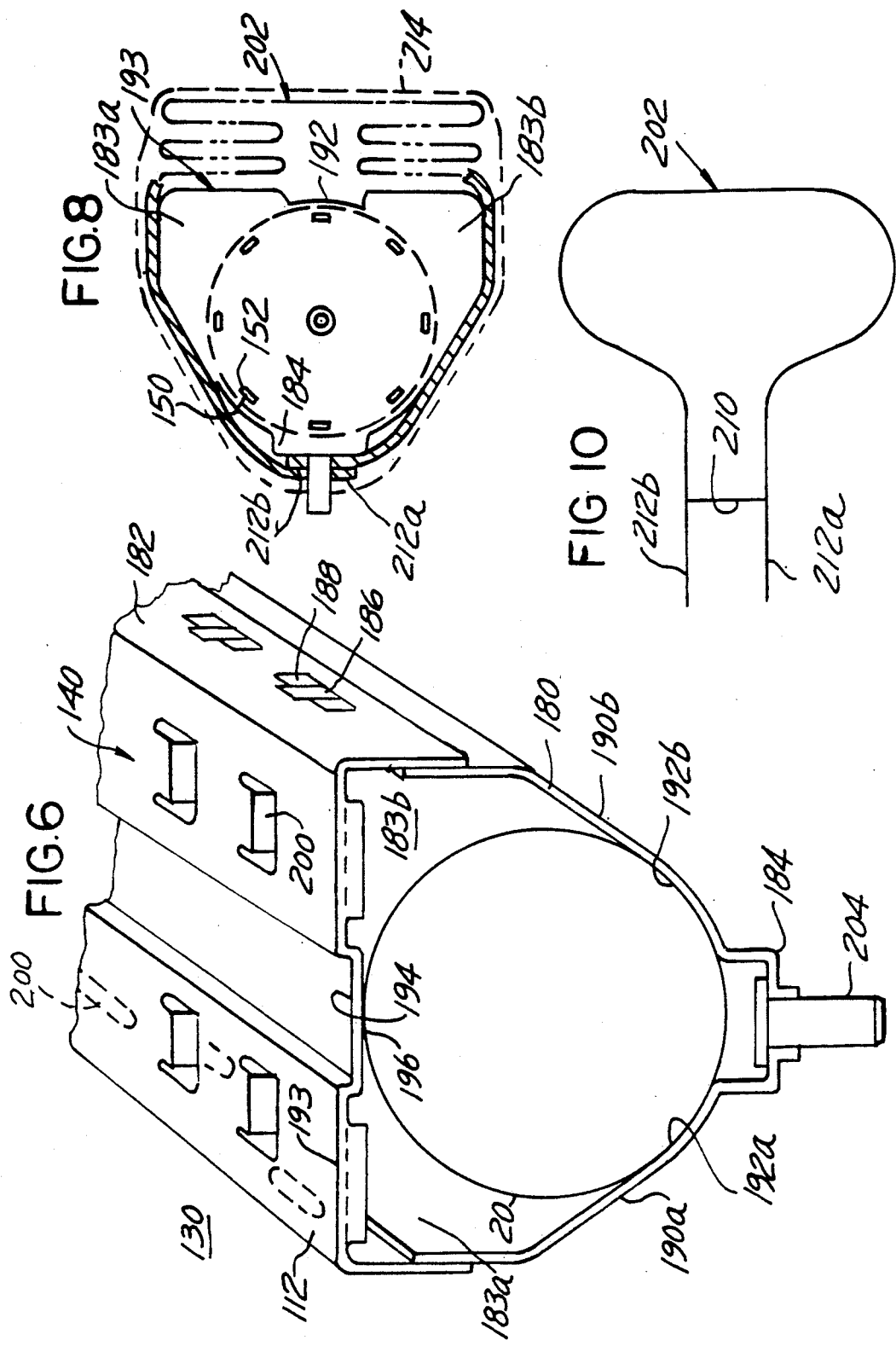

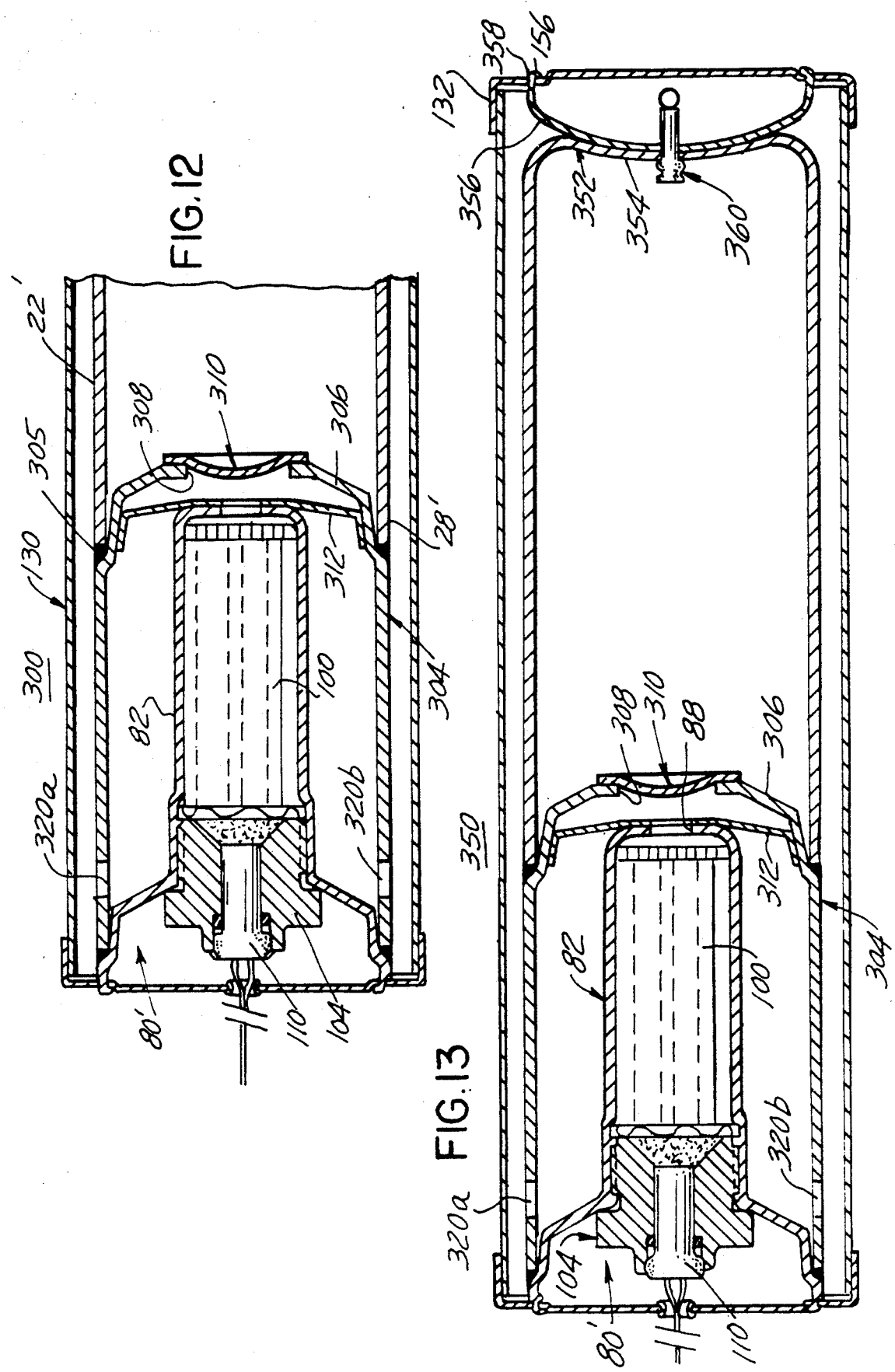

DUAL PYROTECHNIC HYBRID INFLATOR

BACKGROUND AND SUMMARY OF THE INVENTION

The present invention relates to a device for inflating an air cushion, air bag, or the like.

Inflatable bag restraint systems have been shown to reduce the seriousness of injuries and number of fatalities resulting in motor vehicle accidents. There exists a number of means for inflating an air cushion or air bag such as utilizing a quantity of stored gas which is selectively released to expand the air bag. Alternatively, a gas source derived from a gas generating material propellant such as sodium azide, which upon ignition thereof generates a sufficient quantity of gas to expand the air bag. The third type of gas source results from a combination of the stored compressed gas and a gas generating or enhancing material. This last device is often referred to as an augmented gas or hybrid inflator. Various hybrid inflators have been shown in the past such as those illustrated in U.S. Pat. Nos. 3,756,621 and 3,895,821. The inflator shown in U.S. Pat. No. 3,756,621 uses a separate squib or initiator to ignite the propellant and an actuator to open an exit passage to initiate compressed gas flow. U.S. Pat. No. 3,895,821 mounted a single squib outside the pressurized environment of the pressure vessel to ignite the propellant. In that invention a single squib and propellant chamber or housing is placed in a compressed inert gas environment. Upon initiation of the propellant, a heated media is generated, comprising hot gas and particulates which are directed by a discharge nozzle into a small mixing cavity or chamber adjacent a rupturable disk causing same to burst, initiaing gas flow into an air bag. Hot gases continue to be emitted from the propellant chamber and mix with the cold pressurized gas in a small mixing chamber before continuing into the bag to inflate same. The present invention yields advantages in relation to the prior art in that the number of leak passages are reduced, electrical leads are shielded from the harsh environment of the inflation gases, and the inflation rate is controlled.

It is an object of the present invention to provide a hybrid inflator which can rapidly and efficiently generate a sufficient quantity of gas to inflate a cushion or air bag during a vehicle crash situation. A further object of the present invention is to provide an inflator for an air cushion or air bag which improves upon the deficiencies of the prior art.

Accordingly the invention comprises: a hybrid inflator for an cushion comprising in one embodiment a hollow, cylindrical sleeve enclosed at both ends by pyrotechnic actuator assemblies. The enclosed sleeve comprises a pressure vessel for the storage of a quantity of pressurized inert gas such as Argon. A trace amount of helium may be present to facilitate leak testing of the pressure vessel. The first actuator assembly comprises an actuator, detonator or squib for generating a shock wave to break a frangible disk member to enable gas flow through flow orifices associated with the first actuator assembly. A second actuator assembly is positioned opposite from the first actuator assembly and includes another detonator, initiator, squib or the like for initiating the burning of a quantity of propellant. The propellant elevates the temperature of the stored inert gas to increase its volume prior to inflating the air cushion. In one embodiment of the invention a second frangible disk, forming part of the pressure vessel, is positioned opposite the propellant and upon being broken permits heat generated by the propellant to enter the pressure vessel. In another embodiment of the invention, upon breaking the second disk a second flow path is created to permit the egress of the heated inflation gas out from the pressure vessel. In an embodiment of the invention, only a single actuator assembly is used which upon the breakage of the frangible disk permits the stored gas to flow out of the pressure vessel in a direction generally about the propellant. The invention additionally includes a diffuser which supports the inflator and provides a flow passage to the air cushion. The diffuser also supports the air cushion. The diffuser envelopes the inflator in a manner to create relatively large volume regions downstream of any gas outlet in the pressure vessel. This design reduces gas turbulence and reduces the amount of heat transfer between the heated inflation gas and the diffuser.

Many other objects and purposes of the invention will be clear from the following detailed description of the drawings.

BRIEF DESCRIPTION OF THE DRAWINGS

In the drawings:

FIG. 1 illustrates a front cross-sectional view of the present invention.

FIG. 2 illustrates a side end view the present invention.

FIG. 3 illustrates an alternate embodiment of the generator housing assembly.

FIG. 4 shows a cross-sectional view of the propellant used.

FIG. 5 is an enlarged view of an exemplary weld joint.

FIG. 6 is a partial, projected view of a diffuser.

FIG. 8 is a side view of the diffuser with a folded air bag.

FIG. 9 is a diagramatical view of an air bag.

FIG. 10 illustrates an alternate construction of a portion of the present invention.

FIG. 12 illustrates an alternate embodiment of the present invention.

FIG. 13 illustrates a further embodiment of the present invention.

DETAILED DESCRIPTION OF THE DRAWINGS

Figure 7:
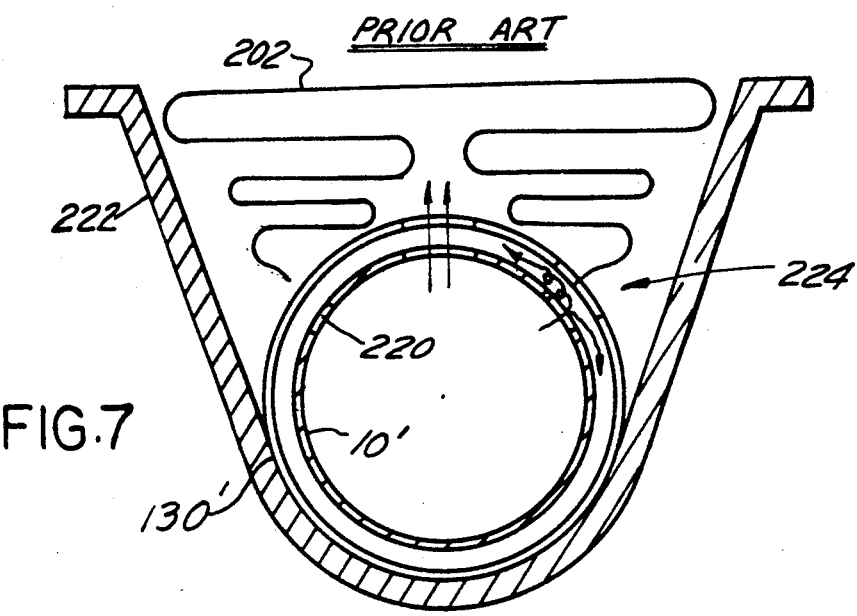
FIG. 7 illustrates prior art diffuser.

With reference to FIG. 1, there is shown a hybrid inflator 10 for inflating an air cushion such as an air bag usable within a vehicle occupant restraint safety system. The inflator 10 comprises a pressure tank generally shown as 20 which includes a hollow sleeve 22. The pressure tank 20 in the space 24 is filled and pressurized with an inert gas such as Argon. The gas may also be a mixture of Argon and another inert gas such as helium. It is contemplated that the amount of helium be approximately 2% by volume of the Argon gas. The purpose of using the second inert gas is to provide a means for detecting defects in the various weld joints of the hybrid inflator which would cause leakage. Devices for sensing the presence of helium such as mass spectrometers are well known in the art. The pressure vessel, and more particularly the sleeve 22, is enclosed at its respective ends 26 and 28 by an initiator housing assembly 30 and by a generator housing assembly 80, which may be viewed as part of the pressure vessel 20.

The initiator housing assembly 30 includes an initiator housing 32 comprising a necked down, narrowed portion 34 and a wider end portion 36. Threadably inserted within the narrowed portion 34 is a spacer or housing 38 having a central opening 39 to receive a detonator 40 of known construction. Extending from the detonator are actuation leads or wires 42. An O-ring 44, provides a seal between the detonator 40 and the spacer 38.

Attached to the initiator housing 32, forming part of the assembly 30, is a manifold assembly 50. The manifold assembly comprises an outer cylindrical portion 52, attached such as by welding (see numeral 54), to the initiator housing 32. The manifold assembly 50 further includes a smaller diameter cylindrical portion 56 recessed relative to the outer portion 52, which is adapted to mate with and receive one end 26 of the sleeve 22. The sleeve 22 and manifold assembly 50 are attached such as at the circumferential weld 58. The manifold assembly further includes a large, flat edge orifice 60 enclosed by a frangible member such as a burst disk 62. A suitable burst disk 62 may be fabricated of nickel or stainless steel. The burst disk is attached to the manifold assembly 50 at a circumferential plasma weld 63 facing the pressurized gas.

Press fit against the wall of the smaller diameter portion 56 is an apertured screen 64 comprising a plurality of openings 66, positioned about a central opening 68, coaxial with the center of the detonator 40. Upon assembly, the screen 64 is slightly deformed inwardly by the narrow portion 34 of the initiator housing 32 to prevent rattling. The screen 64 prevents large objects such as portions of the disk 62 from entering the air bag. The outer cYlindrical portion 52 of the manifold assembly 50 includes at least two orifices 70a and b, diametrically opposed, to provide for a neutral thrust, wherein the total flow area of the orifices 70a and 70b is significantly smaller than the area of the opening 60. Upon actuation of the detonator 40 a pressure, a shock wave is created to break the frangible member or disk 62 permitting at least stored inflation gas to exit the pressure vessel 20. This initial inflation is sometimes referred to as a cold inflation.

In the present invention the narrow orifices 70a and b regulate the flow rate of the inflation gas exiting the pressure vessel 20. The orifice 60 about which the burst disk 62 is positioned does not generate any substantial pressure drop due to its large size. This construction yields the advantage of standardization of design of the inflator from one sized model to The burst disk 62 to orifice 70a and 70b diameter relationship establishes the rupture point of the burst disk 62 as a safety relief device or valve in the event of an over pressurization of the pressure vessel resulting from overheating or flattening of the pressure vessel due to misuse.

The gas generator housing assembly 80 comprises a stepped housing 82 having an enlarged end 84 mating with the other end 28 of the sleeve 22 of the pressure tank 20. The sleeve 22 and housing 82 are joined at a circumferential weld 87. The housing 82, at its inner end 86, includes a central opening 88, covered by a thin burst disk 90 typically fabricated of stainless steel. The disk 90 is welded to the housing 82 in a manner as discussed above.

FIG. 3 illustrates an alternate embodiment of the generator housing assembly 80 in which the end 86, at the previous location of the opening 88, includes a plurality of smaller openings 92, covered by the burst disk 90. In this embodiment the housing 82 material, between the openings 92, provides additional support for the burst disk 90, permitting same to be made significantly thinner than the burst disk 90 shown in FIG. 1. A typical thickness of the burst disk 90 in this situation would be 0.1 mm (stainless steel). Returning to FIG. 1, positioned within the hollow interior of the housing 82 is a grain trap 94 having a plurality of openings 96 therein, which prevent extrusion of the burning propellant 100 into the openings 96. Upstream of the grain trap is a quantity of extruded or shaped propellant 100. The propellant 100 may be Arcite such as that disclosed in U.S. Pat. No. 3,723,205, which is incorporated herein by reference.

The propellant 100 is biased against the grain trap 94 by a wave washer 102. The thickness of this resilient member, i.e., wave washer 102, may be varied to accommodate varying lengths of propellant 100. Threadably received within the housing 82 is a housing 104 of having a central opening 106 which terminates at one end thereof in a conical, divergent nozzle 108. Received within the opening 106 is another detonator or initiator 110 of known design, having a plurality of electrical leads 112 attached thereto. Within the divergent nozzle 108 is an ignition enhancing material 109 comprising boron potassium nitrate whose flame temperature and quantity are suitable for instantaneously igniting the propellant 100.

With reference to FIG. 4, this figure illustrates a cross-sectional view of the propellant 100. The exterior 120 of the propellant 100 is formed in a cloverleaf-type pattern with each cloverleaf having a central opening 122. The purpose of this construction is to provide for a relatively constant propellant burn rate. As the propellant 100 burns its exposed area remains generally constant, that is, as the exterior of the propellant burns its outer surface area reduces while the surface area about each of the cylindrical openings 122 increases, yielding a uniform burn surface and a resulting controllable burn rate. The burn rate is further controlled by the flow area of the central openings 92 or 88. As can be seen, the pressure in the generator housing 82 (which contains the propellant 100) as determined by the openings 92 or 88 is also effective in controlling the total propellant burn time.

The inflator 10 further includes a diffuser 130 comprising end caps 132 and 134, and a main portion 140. The shape of each end cap can be seen in FIG. 2. The end caps 132 and 134 are secured respectively to the initiator housing 32 and gas generator housing 80. This securement may be accomplished by providing the gas generator housing 82 with a plurality of extensions or serrations 150, which extend through openings 152 in the end cap such as 134. These extensions 150 during assembly are crimped over, holding the end cap 134, diffuser 130 and pressure vessel 20 in place. The other end cap 132 may be secured to the initiator housing 32 through a like plurality of extensions or serrations 156 received through openings 158 in the end cap.

The gas generator housing assembly 80, or alternatively, the initiator housing assembly 30, may further include provision for a fill tube 160 of normal construction through which the inert gases are communicated to the interior 24 of the pressure vessel 20. Upon filling the pressure vessel with gas, the fill tube 160 is crimped at a location such as 162 and sealed at location 163. Subsequent to the seal weld operation the crimped portion 162 of the tube 160 may be mechanically squeezed to reopen same to provide for direct communication of inflation or test gas to the welded or sealed joint (at location 163).

Reference is made to FIG. 5 which illustrates an exemplary weld joint such as 58. The following is also applicable to the other weld joints used within the inflator 10 such as 54 and 87. More specifically, FIG. 5 illustrates the junction of the left hand end 26 of the sleeve 22 to the manifold assembly 50. During fabrication of the various assemblies 30 and 80, and after complete fabrication and filling the inflator 10 with gas, each of the weld joints 58 and 87, are leak tested. To facilitate such testing as well as to insure the efficacy of each of these weld joints the present invention contemplates that the various pieces of metal to be welded will be sized and fit together, prior to such welding, so that they touch only in the vicinity of the weld generally avoiding the use of long interference, threaded or press fit contact areas. As such, FIG. 5 shows that the portion 56 of the manifold 50 is slightly spaced (see numeral 166) from the sleeve 22. In this manner, the stored pressurized gas or alternatively a test gas, is permitted to migrate in a relatively unobstructed manner to the point of the weld such as 58. By constructing the fit of the various components in this manner, a leak arising from a defect in the weld can be readily detected during testing of the pressure vessel. This construction is in contrast to the prior art which teaches the use of threadable interconnections or alternatively, interference and press fit connections. Use of a threaded or press fit connection impedes the migration of stored or test gas to the weld point, and as such, leak tests done on prior art inflators did not always detect a defect in the weld because migration of gas to the weld point was significantly restricted, i.e., gas could not migrate to the weld point by the time the pressure vessel was tested. This deficiency in the prior art resulted in what is called infant mortality types of failures. Should threaded connections be required or desired, a milled slot 254 (see FIG. 9) extending the length of the threads would provide an unrestricted passage of the gas to the joint under test. FIG. 9 presents an alternative attachment of parts of the present invention showing a screw thread connection. There is shown a generator housing 82 having threads 250 received within threads 252 in the end 28 of the sleeve 22. A milled slot 254 is provided in one of the sets of threads to permit the direct migration of gas to the weld joint 87. It should be appreciated that the slot 254 can be in either the housing 82 or the sleeve 22 of the pressure vessel 20.

FIGS. 2 and 6 illustrate various views of the diffuser 130. FIG. 6, shows a projected partial view of some of the major components forming the diffuser. The diffuser 130 is essentially a can of specific shape designed to cradle and support the pressure vessel 20. As will be seen, the diffuser 130 also supports an air bag. The diffuser 130 in cooperation with the pressure vessel, also provides a conduit to communicate the inflation gas to the air bag. The diffuser 130 shown in FIG. 6 includes the main portion 140 and end caps 132 and 134 shown in FIG. 1. The main portion 140 may be fabricated of a lower assembly 180 and an upper assembly 182. The upper and lower assemblies 182 and 180, respectively, provide for a three location axial interference fit with the pressure vessel 20. In cross-section the shape of the diffuser 130 is somewhat triangular to provide a three-point contact with the pressure vessel 20. Toward the rear or lower portion as seen in FIG. 6 of the diffuser its shape generally follows that of the cylindrical pressure vessel. Toward the front of the diffuser, i.e., in the direction of the inflating air bag, it departs from the pressure vessel to define volumes 183a and b. The lower assembly comprises an open structure having at its lower extreme a longitudinally extending trough 184. The lower assembly further includes a plurality of tabs 186 designed to fit through a like plurality of openings 188 formed in the upper assembly. The tabs 186 may be bent, crimped or otherwise secured in place. In cross-section the walls 190a and b taper inwardly to intersect with the circular pressure vessel 20 at least along a line contact 192a and b. The walls 190a and b may be arcuately shaped, as shown more clearly in FIG. 6, to provide an interference fit with a greater area of the pressure vessel 20. Positioned within the trough 184 and extending therefrom are a plurality of mounting lugs 204, which may be useful in mounting the inflator 10 and air bag 202 to cooperating portions of the vehicle's structure, avoiding the need for and additional housing (see FIG. 7) to hold the diffuser and inflator, as had been used in the prior art. Various techniques for attaching the lugs 204 to the lower assembly 180 of the diffuser 130 are known in the art.

The upper assembly 182 can be formed with a central longitudinally extending trough 194 which provides at least a point contact (or contact area) at 196 along the pressure vessel 20. The trough 194 may be arcuately shaped as shown in FIG. 2 to contact a larger area of the pressure vessel or flat as shown in FIG. 6. The axially extending trough provides stiffness to the diffuser 130 permitting lightweight materials to be used. The trough 194 is not essential to the invention and if eliminated, the front 193 or top as seen in FIG. 6 of the diffuser would essentially be of planar construction. The upper assembly 182 may further include a plurality of openings 200 to distribute inflation gas to an air bag 202 which is positioned thereabout. The orientation of the holes 200 may extend axially (shown in phantom line) along the top 193 of the assembly 182 or radially or a combination thereof. The location and position of the holes are chosen to assist in limiting any deformation that may occur to the diffuser 130 upon generation of the inflating gases and to evenly distribute the generated gases to the interior of the cushion or air bag.

An advantage of the increased (dead) volume, i.e., 183a, b and the use of the openings 200 in top 193 of the diffuser 130 is to decrease the turbulence in the inflation gas as it exits the pressure vessel and flows through the diffuser 130. Characteristic of prior art inflators/diffusers which typically were of circular cross-section (see FIG. 7), was a high degree of turbulence in the inflation gas as it exited the pressure vessel. This turbulence assisted in creating a large heat transfer between the heated inflation gas and the prior art diffuser. Heat lost from the inflation gas reduces its volume and hence the efficiency at which the air bag is inflated. Use of a greater amount of stored gas and/or propellant was required to compensate for this effect in the prior art. In contrast, the present invention reduces turbulent flow, reduces the pressure drop across the diffuser, and reduces the amount of heat transfer to yield more efficient performance. FIG. 7 which is illustrative of the prior art, shows a typical cylindrically shaped inflator 10' positioned within a cylindrical, closely spaced diffuser 130'. The inflator may be of the hybrid type such as the present invention or alternatively, a sodium azide based inflator as is known in the art. Inflation gas exited openings such as 220 flows turbulently through the diffuser 130' to inflate an air bag 202 which is diagramatically illustrated. The diffuser 130', inflator 10' and air bag are typically secured within a reaction can 222, which is then secured to a portion of the vehicle such as its instrument panel. Reference is made to numeral, 224, which illustrates a trapped volume 226 within the reaction can 222. This volume was not effectively utilized since the air bag 202 could not be tightly folded therein.

With regard to the present invention, FIG. 8 diagramatically illustrates an air bag 202 secured about the inflator 10. More particularly, the air bag 202 comprises an open end 210 into which is received the diffuser 130 (see FIG. 10). The air bag 202 proximate its end 210 may include a plurality of extending flaps 212a and b, which are received about the diffuser 130 in an overlapping manner (see FIG. 8) with the mounting lugs 204 extending therethrough. The air bag 202 may be maintained in its folded configuration by enveloping same with a thin tearable cover 214 shown in dotted line in FIG. 8. This feature allows the unit to be directly attached to the vehicle mounting structure without the need for an intermediate housing or reaction can. In this case the vehicle instrument panel could include a cavity or shape similar to the reaction can shown in FIG. 7. In contrast, the non-circular cross-section of the present diffuser 130 relative to the generally cylindrically shaped inflator 10 or pressure vessel 20 is arranged to minimize the surface area to which the inflation gases are exposed and also to minimize the pressure drop to reduce heat loss without affecting the overall package size of the unit. From FIGS. 1 and 6 it should be appreciated that the exit orifices 70a and b direct inflation gases directly into the volumes 183a and b of the diffuser 130. In addition, a further advantage of the present invention is achieved with regard to the aspect of folding the air bag and positioning it relative to the diffuser. By utilizing the generally flat top surface 193 of the diffuser provides an ideal surface upon which the air bag may be folded.

In view of the above, it is contemplated that the diffuser 130 may be fabricated of lightweight material. More specifically, the lower assembly 180 may be fabricated of aluminum, while the upper assembly 182 may be fabricated of a high strength, low alloy steel.

Reference is made to FIG. 1 and more particularly to the orientation of the electrical wires or leads 42 and 112 extending from the actuator 40 and initiator 110. As can be seen from FIG. 1, these leads or wires 42 and 112, respectively, are exterior to the pressure vessel and as such, are not subject to the heat generated by the actuator 40 or initiator 110 upon excitation. It is contemplated that the wires 42 will be fed from the right hand side of the inflator 10 as shown in FIG. 1, through the trough 184 and exit the initiator at its left side through an opening 220 in the cover 134. This construction facilitates attachment to a controller, eliminates loose and dangling wires and reduces the number of electrical connectors needed. Correspondingly, the cleanliness of the generated gases in the present invention, are enhanced as the breakdown of foreign materials (such as due to the melting of the internal wires) is prevented for better management of effluent which also reduces toxicological concerns. In the prior art, such as illustrated by U.S. Pat. No. 3,756,621, the wires extended through the pressure vessel and were subject to the extremely harsh environment generated upon activation of propellant such as 100.

The following briefly describes a typical fabrication process that may be utilized to assemble and test the inflator 10. The initiator housing assembly 30 is assembled by positioning the screen 64, if used, within the manifold assembly 50 and welding the manifold assembly to the initiator housing 32 at location 54. The burst disk 62 is welded about the opening 60 using a plasma weld process At this time this sub-assembly does not include the actuator 40 and spacer 38. The interior of this assembly is evacuated in a test chamber to create a vacuum, and a test gas such as helium is exposed to the pressure vessel side of the burst disk 62. A leak test is accomplished by testing for the migration of helium across the burst disk weld. It is important to note that helium test gas will be applied to the side of the burst disk which will tend to lift it from the surfaces it is welded upon. If test gas is applied oppositely, the test gas would tend to hold the burst disk to these surfaces and mask a leak. Thereafter, the sleeve 22 is assembled to the manifold assembly 50 and welded at 58. The generator housing assembly 80 is similarly mounted to the sleeve and welded at 87. Actuation gas comprising Argon and a small percentage of helium, is placed within the completed pressure vessel 20 and filled to its operating pressure which is approximately 3,000 psi. Thereafter, the welds at locations 58 and 87 are leak tested. Subsequently, the spacer 38 and actuator 40 are threadably received within the initiator housing 32. The various components comprising the initiator housing assembly, i.e., the grain trap 94, propellant 100, spring disk 102, housing 104, and initiator 110 are assembled to the generator housing 82. By following this assembly technique, if the pressure vessel fails the leak test, the various pyrotechnic related components need not be scrapped. Further, the present invention is well suited to a wide range is welding techniques since the pyrotechnic elements are not mounted during welding. In the prior art the welding technique was restricted to one which would generate a minimum heat affected zone so as not to ignite the mounted pyrotechnic elements. Typically, an electron beam weld was used, however, this technique is expensive and ill-suited for mass production. Upon final assembly of the inflator 10, the air bag 202 is secured thereto.

The generator housing assembly is also tested for leaks at the interface between the burst disk 90 and the generator housing 82 in a manner described above. The diffuser 130 comprising the end covers 132 and 134 and the top and bottom assemblies 180 and 182 are thereafter attached to and about the inflator. 10.

Figure 11:
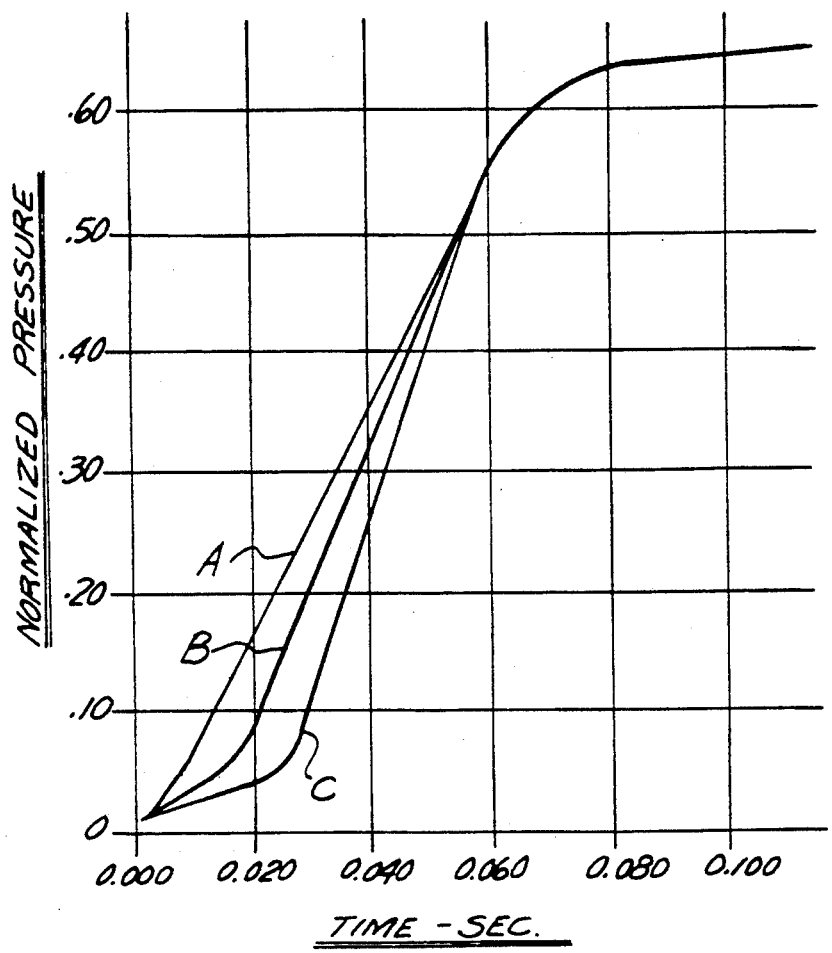
FIG. 11 illustrates a graph of inflation curves.

The dual pyrotechnic configuration of the present invention yields flexibility in that the rate of inflation of the air bag 202 can be controlled. It is desirable to control the initial rate of inflation so that the air bag does not too forcefully impact the occupant, especially an out-of-position occupant such as a standing child. In this regard, the inflator can be made operative by simultaneously initiating the actuator 40 and the initiator 110. This type of initiation yields the most aggressive air bag filling (see Curve A, FIG. 11). Alternatively, the actuator 40 may be initiated generating a shock wave which ruptures the disk 62, causing an initial cold gas inflation as the stored Argon inflation gas exits the flow orificies 70a and b and begins to inflate the air bag 202 (see Curve B, FIG. 11). Thereafter, for example, after a time delay 7, 10 or 16 milliseconds, the initiator 110 is activated thereby causing the propellant 100 to burn, which in turn raises the temperature of the remaining stored gas within the pressure vessel, thereby increasing the volume of gas available to inflate the air bag. In this manner, the initial cold gas inflation provides for an initially slower inflation rate of the air bag yielding a relatively soft contact with the out-of-position occupant, which is thereafter followed by the more rapid inflation of the air bag upon activation of the initator 110. The sequence of activation of the actuator 30 and/or initiator 110 depends to a large extent on the design of the vehicle and to the size of the passenger compartment. As an example, consider a frame or other support structure of a particular vehicle which tends to absorb less of the energy of a crash thereby transmitting more of same to the occupant. In this situation, the more aggressive inflation rate of Curve A may be called for. If the vehicle is such that it absorbs more of the crash energy, a less aggressive inflation rate such as Curve B would initially provide for the gradual envelopment of the passenger. It can be seen, however, that based upon the graphs of FIG. 11, that maximum air bag inflation is achieved at approximately the same point whether or not the inflation procedure is that for Curve A or Curve B.

In some situations it has been found that it is desirable to in fact delay activation of the initiator 110 for a period up to and perhaps exceeding 25 milliseconds. It can be appreciated that if the inflator 10 of FIG. 1 is utilized, a significant amount of cold, stored inflation gas will have left the pressure vessel 20 during this extended time delay period. FIG. 12 illustrates an alternate embodiment of the present invention which illustrates an inflator 300 suited to an inflation regime requiring extended time delay activation periods. FIG. 12 illustrates the left hand portion of such inflator 300. It should be appreciated that the right hand portion is identical to that of FIG. 1. Inflator 300 comprises a generator housing assembly 80', including a second manifold assembly 304 welded to a sleeve end 28' at a circumferential weld joint 305 to the sleeve 22'. The second manifold assembly 304 is cylindrically shaped, terminating at a recessed end 306, having a sharp edge opening 308. The end 306 supports a second burst disk 310. Positioned within the second manifold assembly 304 is the generator housing 82, comprising the propellant 100, initiator 110, etc. It should be appreciated that the burst disk 90, previously used to enclose the opening 88 of the housing 82, has been removed. An optional screen such as 312, similar to screen 64, may be positioned across the opening 308. The manifold assembly 304 further includes a second set of gas flow orifices 320a and b, disposed in a generally thrust neutral condition. Positioned about the sleeve 22' is the diffuser 130 discussed above. In this embodiment of the invention the flow orifices 320a and 320b are sized to be larger than the flow orifices 70, fabricated within the manifold 50. More particularly, the flow areas may have a ratio of three to one. As an example, the total flow area of the orifices 70a and 70b may be approximately 0.32 square centimeters (0.05 square inches) wherein the total flow area of the orifices 320a and 320b may be approximately 0.97 square centimeters (0.15 square inches). In response to a signal indicative of a crash situation, the actuator 40 would be activated thereby opening the burst disk 62 causing a cold inflation of the air bag as the stored inflation gases exit the orifices 70a and 70b, resulting in the reduced slope portion of Curve C, FIG. 11. Thereafter, the initiator 110 is activated causing the propellant 100 to burn away the second burst disk 310, thereby creating a second flow path for the remaining stored gas to exit the pressure vessel Upon removal of the burst disk 310, the remaining stored gas exits the pressure vessel through the opening 308, the optional screen 312 and then exits through the larger orifices 320a and 320b, thereby increasing the rate at which the stored gases exit the pressure vessel which results in the increased slope portion of Curve C. As the inflation gases exit the opening 308 they pass directly across the heat generated by the propellant, thereby increasing the volume of same as it exits the pressure vessel and flows into the air bag or cushion.

FIG. 13 illustrates a further alternate embodiment of the invention having a single pyrotechnic element such as the initiator 104. The structure of this inflator 350 builds upon the alternate embodiment shown in FIG. 12. More specifically, the left hand portion of this inflator 350 is identical to that of FIG. 12. The sleeve portion 302 of the pressure vessel terminates at its right hand side in an arcuately or perhaps spherically shaped surface 354. Attached to the end 352 is a retaining member such as the cup-like structure 356 welded thereto. The ends 358 of this structure 356 include the tabs such as 156 which, as previously mentioned, extend from the actuator housing 32 for attachment to the diffuser end 132. A fill tube 360 is provided in the end 352 for filling the pressure vessel with inert inflation gas. Upon activation of the initiator 110, the burst disk 310 is opened, thereby permitting heated inflation gas to exit the orifices 320a and b. The resulting inflation curve of this single pyrotechnic unit will essentially follow that of Curve A of FIG. 11

Many changes and modifications in the above described embodiment of the invention can, of course, be carried out without departing from the scope thereof. Accordingly, that scope is intended to be limited only by the scope of the appended claims.

We claim:

1. An inflator for an air cushion or bag comprising:
a hollow, cylindrical sleeve having first and second ends;
first means for enclosing the first end of the sleeve;
second means for enclosing the second end (28) of the sleeve, the sleeve, and first and second means comprising a pressure vessel for storing a quantity of pressurized inert gas used to inflate the air bag;
the first means comprises an initiator housing assembly comprising a manifold adapted to be secured to the sleeve at the first end including a flat edge first orifice, a first frangible member comprising a first rupturable disk secured about the first orifice, wherein one side of the disk is exposed to the stored gas; the manifold further including first flow control means, positioned remote from the pressure vessel for regulating the flow of inflation gas as it exits the pressure vessel and a pyrotechnic first actuator means for breaking the first frangible member wherein the initiator housing assembly, includes an initiator housing secured to the manifold assembly remote from the gas in the pressure vessel, the initiator housing comprises a hollow, necked-down portion, the first actuator means is removably received in the housing and closely spaced to the disk so that upon activation of the pyrotechnic actuator means the disk is ruptured by a shock wave to initiate flow of the inflation gas through the first orifice and first flow control means.

2. The inflator as defined in claim 1 wherein the initiator housing assembly includes first screen means for filtering solid matter in the inflation gas prior to the gas exiting the first flow control means; the screen means secured to the manifold assembly downstream of the disk and upstream of the first flow control means.

3. The inflator as defined in claim 2 wherein the second means includes a second manifold assembly connected to the sleeve to form part of the pressure vessel and positioned about the generator housing, wherein the second manifold assembly includes a flat edge second orifice closed by a second frangible member comprising a second rupturable disk positioned apart from the second housing end, second flow means for regulating gas flow therethrough.

4. The inflator as defined in claim 3 wherein the first and second flow means comprise first and second flow orifices respectfully, and wherein the flow area of the first flow means is less than the flow area of the second flow means.

5. An inflator for an air cushion or bag comprising:
a hollow, cylindrical sleeve having first and second ends;
first means for enclosing the first end of the sleeve;
second means for enclosing the second end (28) of the sleeve, the sleeve, and first and second means comprising a pressure vessel for storing a quantity of pressurized inert gas used to inflate the air bag;
the first means comprises an initiator housing assembly comprising a manifold adapted to be secured to the sleeve at the first end including a flat edge first orifice, a first frangible member comprising a first rupturable disk secured about the first orifice, wherein one side of the disk is exposed to the stored gas; the manifold further including first flow control means, positioned remote from the pressure vessel for regulating the flow of inflation gas as it exits the pressure vessel and a pyrotechnic first actuator means for breaking the first frangible member wherein the second means comprises a generator housing assembly including a hollow, elongated generator housing including a first housing end and a second housing end, the first housing end is secured to the second end of the sleeve, the second housing end (86) includes at least one opening enclosed by a second frangible member comprising a second rupturable disk.

6. The inflator as defined in claim 5 wherein generator housing assembly further includes a grain trap, including a plurality of trap openings, positioned proximate the second housing end, a quantity of formed propellant and a resilient member for biasing the propellant into the grain trap and a pyrotechnic second actuator means spaced from the resilient member for initiating, upon activation, the burning of the propellant.

7. The inflator as defined in claim 6 wherein the second actuator means includes a divergent nozzle spaced from and facing the propellant.

8. The inflator as defined in claim 7 wherein the second actuator means includes an ignition enhancing means for rapidly initiating burning of the propellant in the divergent nozzle.

9. The inflator as defined in claim 7 wherein the ignition enhancing means includes a quantity of boron potassium nitrate.

10. The inflator as defined in claim 5 wherein the actuator housing assembly and generator housing assembly are welded to the sleeve in a manner to permit the unobstructed migration of stored gas to the point of weld.

11. The inflator as defined in claim 10 wherein the first actuator means, second actuator means and propellant are located exterior to the stored gas.

12. The inflator as defined in claim 11 wherein the generator housing includes a first housing end and a second housing end, the first housing end is secured to the second manifold assembly, the second housing end includes at least one opening positioned opposite the second rupturable member such as a disk.

13. The inflator as defined in claim 12 wherein a second screen is positioned about at least one opening in the second housing end and mated with a portion of the second manifold assembly.

14. An inflator for an air cushion or bag comprising:
a hollow, cylindrical sleeve having first and second ends;
first means for enclosing the first end of the sleeve;
second means for enclosing the second end (28) of the sleeve, the sleeve, and first and second means comprising a pressure vessel for storing a quantity of pressurized inert gas used to inflate the air bag;
the first means comprises an initiator housing assembly comprising a manifold adapted to be secured to the sleeve at the first end including a flat edge first orifice, a first frangible member comprising a first rupturable disk secured about the first orifice, wherein one side of the disk is exposed to the stored gas; the manifold further including first flow control means, positioned remote from the pressure vessel for regulating the flow of inflation gas as it exits the pressure vessel and a pyrotechnic first actuator means for breaking the first frangible member including diffuser means in communication with the first flow control means, for supporting the pressure vessel and for directing inflation gas into an air cushion, the diffuser including a lower portion adapted to support a lower portion of the pressure vessel, the diffusing further including an upper portion adapted to mate along with an upper portion of the pressure vessel, the diffuser upper portion including a plurality of openings to permit inflation gas to flow thereacross, and defining in cooperation with the pressure vessel two volume regions proximate the upper portion of the pressure vessel so as to provide a means for reducing turbulance of the inflation gas and to reduce the heat transfer of the inflation gas with the diffuser.

15. The inflator as defined in claim 14 wherein the diffuser includes end caps, one cap attached to the actuator housing assembly and the other cap attached to the generator housing assembly for enclosing respective ends of a main portion of the diffuser.

16. The inflator as defined in claim 14 wherein the lower portion of the diffuser includes a trough, enclosed by a portion of the pressure vessel, adapted to receive wires associated with the first actuator means and for shielding these wires from the inflation gas.

17. The inflator as defined in claim 14 wherein the diffuser means comprises attachment means comprising a plurality of bolts extending therefrom for containing the air bag and for providing means for directly attaching the diffuser to vehicle support structure.

* * * * *